Figure 1:
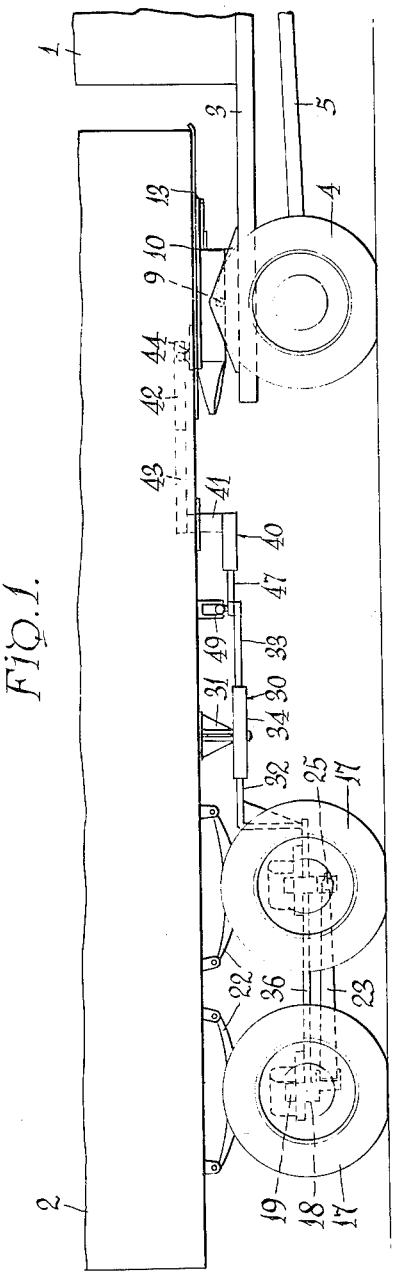

Aug. 7, 1962   M. A. CARMODY   3,048,423
TRACTOR-TRAILER STEERING COMBINATION
Filed Jan. 31, 1961

INVENTOR.
Michael A. Carmody,
BY
Bean, Brooks, Buckley & Bean.
ATTORNEYS.

United States Patent Office 3,048,423
Patented Aug. 7, 1962

3,048,423
TRACTOR-TRAILER STEERING COMBINATION
Michael A. Carmody, 5 Scheu Park, Buffalo, N.Y.
Filed Jan. 31, 1961, Ser. No. 86,100
3 Claims. (Cl. 280—426)

This invention is directed to the tractor-trailer art, and more specifically to a new and useful arrangement for steering the supporting wheels of a trailer automatically in response to turning of the tractor relative to the trailer.

My earlier Patent 2,259,612 discloses an arrangement for automatically steering the supporting wheels of a trailer in response to turning of the tractor. The particular embodiment specifically disclosed in said patent shows a lever which is pivoted upon turning of the tractor, with such pivoting of the lever being translated into rotation of a shaft for steering the trailer wheels. The end of the pivoted lever connected to the tractor moves through an arcuate path, whereby continued turning of the tractor results in a decreasing rate of throw of the lever, with the result that the trailer wheels do not track to the full extent desired.

The primary object of this invention is to provide an automatic steering arrangement for the trailer supporting wheels in a tractor-trailer combination, which arrangement causes the trailer wheels to more nearly exactly track the turning tractor.

Another object of this invention is to accomplish the foregoing in a relatively simple and inexpensive construction which is extremely durable and dependable in operation.

In one aspect thereof, a tractor-trailer steering arrangement constructed in accordance with my invention is characterized by the provision of first lever means pivotally supported on the trailer for lateral movement relative thereto, the first lever being connected adjacent one end to the trailer wheels, which are mounted for steering relative to the trailer, for steering the wheels upon lateral pivoted movement of the first lever means, second lever means pivotally supported on the trailer and connected adjacent one end to the tractor for being laterally pivoted upon turning movement of the tractor relative to the trailer, the other ends of the first and second lever means including telescoping end portions pivotally interconnected whereby lateral pivoting of the second lever means in one direction, upon turning of the tractor relative to the trailer, causes lateral pivoting of the first lever means in the opposite direction, to steer the trailer supporting wheels in a direction opposite to the direction of turning of the tractor.

Figure 2:
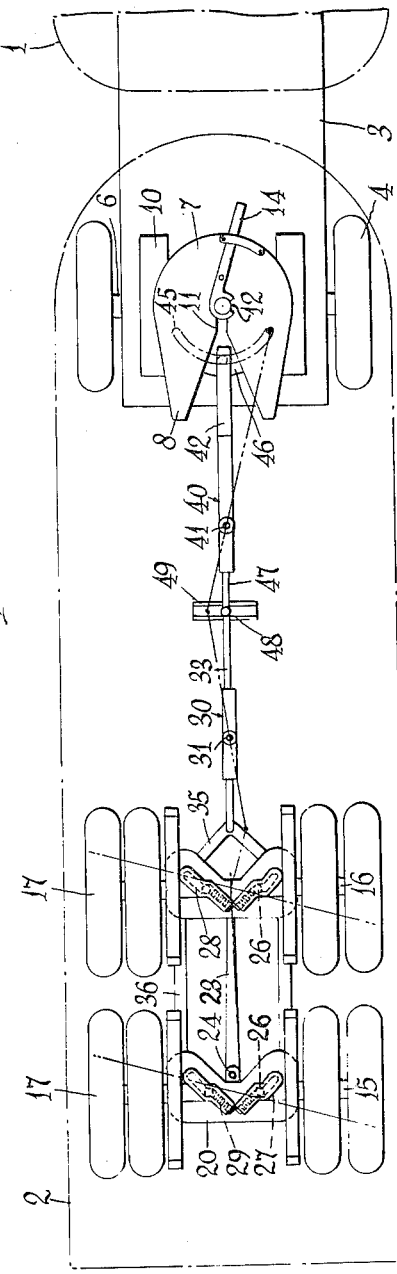

The foregoing and other objects, advantages and characterizing features of the tractor-trailer combination of my invention will become clearly apparent from the ensuing detailed description of one, presently preferred embodiment thereof, taken in conjunction with the accompanying drawing illustrating said embodiment, wherein like reference numerals denote like parts throughout, and wherein:

FIG. 1 is a side elevational view of a tractor-trailer combination incorporating one form of automatic steering mechanism constructed in accordance with my invention, portions of the trailer and tractor being broken away for convenience of illustration; and FIG. 2 is a top plan view of the steering mechanism, with the tractor cab, the trailer, and certain other portions being shown in phantom for greater clarity and for convenience of illustration.

Referring now to the details of the embodiment illustrated in the accompanied drawing, there is shown a tractor or power unit, generally designated 1, and a trailer or semi-trailer unit, generally designated 2. The tractor 1 includes a frame 3 supported by ground engaging wheels 4, with a drive shaft 5 to the wheel axle 6. Tractor 1 carries a conventional lower fifth wheel unit 7 having the usual flaring ends 8 and supported in trunnion bearings 9 on brackets 10. Fifth wheel 7 has the usual slot 11 for receiving a king pin 12 extending from an upper fifth wheel unit 13 carried on the bottom of trailer 2, and lock 14 of conventional construction is provided for releasably locking the king pin 12 in place in slot 11 of the lower fifth wheel 7.

Trailer 2 is supported adjacent its rearward end by a pair of axles 15, 16, which carry at each of the opposite ends thereof one or more wheels 17. While axles 15, 16 could be fixed, and the wheels mounted on spindles, in the manner of my earlier Patent 2,259,612, for economy, and further steering effect I prefer that the wheels be mounted by means of the axle arrangement illustrated in Patent 2,798,734, issued to Robert M. Gregg and assigned to me, and particularly FIG. 4 thereof.

As disclosed and described in said Patent 2,798,734, each such axle 15, 16 includes a lower axle part 18 and an upper axle part 19 superimposed thereon. Each lower axle part 18 has a bearing pad 20 forming a support for the upper axle part 19. The axles 15, 16 are supported by elliptic springs 22 attached to the axles and to the trailer body by suitable means, and a torque rod 23 is provided to counteract the rotative tendency of the axles, the rod 23 being pivotally mounted on a bracket 24 attached to the rear axle 15, and extending forwardly into a ball and socket joint 25 associated with axle 16.

Each of the lower axle parts 18 has a pair of steering pins 26 extending upwardly into offset slots 27 within housings 28 on axle parts 19, the pins being urged to a neutral or center position by springs 29, whereby upon turning the trailer the frictional resistance produced by wheels 17 causes steering thereof relative to the trailer 2.

The automatic steering mechanism of this invention comprises a first lever 30 pivotally supported on the trailer 2, by a pivot bracket 31, for lateral pivoting movements relative thereto. The opposite ends 32 and 33 of the lever 30 are telescopically supported in a housing 34, with the telescoping end 32 being pivotally connected to a steering bracket 35 which latter is connected to the axle part 18 of the axle 16, for steering the latter upon lateral pivoting of lever 30. Steering movements of axle 16 are transmitted to the axle 15 by the levers 36 extending between the axles 15, 16, on opposite sides of the center line of the trailer, and pivotally connected to the axles in generally a parallelogram arrangement.

A second lever 40 also is pivotally supported on the trailer 2, at 41, and has an end 42 which telescopes within a housing portion 43. The telescoping end 42 is pivotally connected to a member 44 which extends through an arcuate slot 45 into pivot connection with a block 46, which latter is confined between the flaring ends 8 of the lower fifth wheel 7 for turning movement therewith relative to the trailer 2.

In accordance with my invention, the telescoping ends 33 and 47 of levers 30 and 40, respectively, are pivotally interconnected at 48, whereby pivoting of lever 40 in one direction will produce pivoting of lever 30 in the opposite direction. It is a particular feature of my invention that the pivot connection 48 is constrained, by guide 49, for movement substantially only in a straight line, laterally of the trailer 2.

With this construction it will be seen that, upon turning of tractor 1 relative to trailer 2, the member 44 attached to the forward end of lever 40 is caused to follow the arcuate slot 45. This causes the lever 40 to pivot about its pivot axis 41. Thus, for example, as shown in FIG. 2, if the tractor turns in a counterclockwise direction, it will swing the lever 40 to the position illustrated in broken lines. Because of its pivot connection 48 with lever 30, lever 40 causes lever 30 to pivot in the opposite direction, to the position shown in broken lines in FIG. 2. This in turn steers the wheels 17, causing the axles 15, 16 to assume the position indicated in broken lines in FIGURE 2.

It will be seen that the rate of lateral movement of the telescoping end 42 of lever 40, decreases with increased turning of the tractor, because of the arcuate shape of slot 45. Unless appropriate compensation is made, such decreasing rate of lateral swing of lever 40 would mean that, while the wheels 17 might track properly in the very beginning, they would not continue to track properly as the tractor continued turning relative to the trailer. While some steering and tracking would occur, it would not correspond to the full degree of turning of the tractor.

However, with my invention, the telescoping ends 33, 47 are constrained to a straight line movement by the guide 49. Therefore, as the levers 30, 40 pivot in either direction, the ends 33, 47 are extended, by the telescoping action, and therefore move on a constantly increasing radius. As a result of this increase in the radius of pivot connection 48 from pivot supports 31, 41 with continued turning of the tractor, the pivot connection 48 is caused to move faster and further laterally than the pivot member 44 in the arcuate slot 45. Therefore, with my arrangement, the arcuate movement of member 44 is translated into a rectilinear movement, with the result that the degree of steering is increased, to offset the decreasing swing produced by the arcuate slot. Consequently, wheels 17 are caused to more nearly track.

It will be appreciated that the foregoing detailed description and illustration is given by way of exemplification only, and that my invention is not necessarily limited to such details. The particular placement of the various pivot connections 31, 48 and 41, the particular construction of the levers 30, 40, and like details can be varied by those skilled in the art to produce the desired end result and to meet the particular conditions and requirements involved in a particular case, without in any way departing from my invention.

Having fully disclosed and described my invention, and its mode of operation, what I claim as new is:

1. In a tractor-trailer combination having a connection therebetween enabling turning movements of said tractor relative to said trailer, said trailer having a ground-engaging supporting wheel, means mounting said wheel on said trailer for steering movements relative thereto, and means automatically steering said wheel in a direction opposite to that assumed by said tractor upon turning movement of the latter relative to said trailer, said last-named means including lever means pivotally supported on said trailer for lateral movement relative thereto, said lever means being connected to said wheel for steering the same upon such lateral pivoting movement of said lever means, means connecting said lever means to said tractor for lateral pivoting movement of said lever means upon turning movement of said tractor relative to said trailer, said connecting means including means translating arcuate turning movement of said tractor into rectilinear movement of an end of said lever means laterally of said trailer.

2. In a tractor-trailer combination having a connection therebetween enabling turning movements of said tractor relative to said trailer, said trailer having a ground-engaging supporting wheel, means mounting said wheel on said trailer for steering movements relative thereto, and means automatically steering said wheel in a direction opposite to that assumed by said tractor upon turning movement of the latter relative to said trailer, said last-named means including first lever means pivotally supported on said trailer for lateral movement relative thereto, said first lever means being connected adjacent one end thereof to said wheel for steering the same upon such lateral pivoting movement of said first lever means, second lever means pivotally supported on said trailer for lateral movement relative thereto, said second lever means being connected adjacent one end thereof to said tractor for lateral pivoting movement of said second lever means upon turning movement of said tractor relative to said trailer, the other ends of said first and second lever means including telescoping end portions pivotally interconnected, said one end of said second lever means includes a telescoping end portion movable through an arcuate path upon turning of said tractor relative to said trailer, together with means constraining the pivot connection between said other lever end portions to substantially straight line movement laterally of said trailer, whereby lateral pivoting of said second lever means in one direction cause lateral pivoting of said first lever means in the opposite direction.

3. In a tractor-trailer combination having a connection therebetween enabling turning movements of said tractor relative to said trailer, said trailer having a ground-engaging supporting wheel, means mounting said wheel on said trailer for steering movements relative thereto, and means automatically steering said wheel in a direction opposite to that assumed by said tractor upon turning movement of the latter relative to said trailer, said last-named means including first lever means pivotally supported on said trailer for lateral movement relative thereto, said first lever means being connected adjacent one end thereof to said wheel for steering the same upon such lateral pivoting movement of said first lever means, second lever means pivotally supported on said trailer for lateral movement relative thereto, said second lever means being connected adjacent one end thereof to said tractor for lateral pivoting movement of said second lever means upon turning movement of said tractor relative to said trailer, the other ends of said first and second lever means including telescoping end portions pivotally interconnected whereby lateral pivoting of said second lever means in one direction cause lateral pivoting of said first lever means in the opposite direction, said trailer having two axles each carrying at least one pair of supporting wheels, said one end of said first lever means being connected to one of said pairs of wheels for steering the same, the other of said pairs of wheels being connected to said one pair of wheels for being steered therewith.

References Cited in the file of this patent

UNITED STATES PATENTS 2,798,734    Gregg _____ July 9, 1957

FOREIGN PATENTS 411,141    Germany _____ Mar. 24, 1925
430,886    Italy _____ Feb. 20, 1948